United States Patent
Komai

(10) Patent No.: US 10,466,079 B2
(45) Date of Patent: Nov. 5, 2019

(54) SENSOR DEVICE

(71) Applicant: OMRON Corporation, Kyoto (JP)

(72) Inventor: Kazunari Komai, Kameoka (JP)

(73) Assignee: OMRON Corporation, Kyoto (JP)

( * ) Notice: Subject to any disclaimer, the term of this patent is extended or adjusted under 35 U.S.C. 154(b) by 187 days.

(21) Appl. No.: 15/842,898

(22) Filed: Dec. 15, 2017

(65) Prior Publication Data

US 2018/0259372 A1   Sep. 13, 2018

(30) Foreign Application Priority Data

Mar. 13, 2017 (JP) ................. 2017-047277

(51) Int. Cl.
| | |
|---|---|
| G01D 11/24 | (2006.01) |
| G01D 5/34 | (2006.01) |
| G01B 11/26 | (2006.01) |
| G01V 8/12 | (2006.01) |
| H01H 35/00 | (2006.01) |

(52) U.S. Cl.
CPC ............ G01D 11/245 (2013.01); G01B 11/26 (2013.01); G01D 5/34 (2013.01); *G01V 8/12* (2013.01); *H01H 35/00* (2013.01)

(58) Field of Classification Search
CPC ........ G01D 11/245; G01D 5/34; G01B 11/26; H01H 35/00; G01V 8/12

USPC ......................................................... 250/239
See application file for complete search history.

(56) References Cited

U.S. PATENT DOCUMENTS

| | | | | |
|---|---|---|---|---|
| 5,432,340 A | * | 7/1995 | Shibata | ................ G02B 6/4277 |
| | | | | 250/227.11 |
| 7,939,796 B2 | * | 5/2011 | Satone | ................. G01D 11/245 |
| | | | | 250/231.13 |

FOREIGN PATENT DOCUMENTS

| | | |
|---|---|---|
| JP | 2007073417 | 3/2007 |
| JP | 2010205454 | 9/2010 |

* cited by examiner

*Primary Examiner* — Seung C Sohn
(74) *Attorney, Agent, or Firm* — JCIPRNET

(57) ABSTRACT

A sensor device includes a resin inner housing which has an accommodating space therein and in which an opening is provided, an externally exposed part which is disposed to cover the opening or pass through the opening and of which at least a part is exposed to the outside of the inner housing, and a metal outer housing which is positioned outside the inner housing and accommodates the inner housing and covers the inner housing. When a sealing treatment is performed between the inner housing and the externally exposed part, the accommodating space is sealed off from a space outside the inner housing. When a cut-off part is provided in the outer housing at a position corresponding to the part exposed to the outside of the inner housing of the externally exposed part, the part of the externally exposed part is also exposed to the outside of the outer housing.

18 Claims, 10 Drawing Sheets

SENSOR DEVICE

CROSS-REFERENCE TO RELATED APPLICATION

This application claims the priority benefit of Japanese application serial no. 2017-047277, filed on Mar. 13, 2017. The entirety of the above-mentioned patent application is hereby incorporated by reference herein and made a part of this specification.

BACKGROUND

Technical Field

The disclosure relates to a sensor device typified as a photoelectric sensor.

Description of Related Art

In general, a sensor device is configured such that various constitutional components including electronic components are accommodated in an accommodating space provided inside a housing and windows, openings, and the like are provided in the housing.

For example, in a reflection type photoelectric sensor, a light projector and a light receiver are accommodated inside a housing, and a window is provided in the housing so that light emitted from the light projector is emitted to the outside of the housing, and its reflected light enters inside the housing and is received by the light receiver. In addition, various components constituting a display part and an operation part are also accommodated inside the housing, and a window, an opening, and the like are provided in the housing at positions corresponding thereto. In addition, a cable for performing input and output is disposed to pass through the opening provided in the housing.

Generally, sealability and robustness are necessary for a sensor device in order to prevent the sensor device from being influenced by the external environment. Sealability is a property necessary for preventing moisture and the like from entering the inside of the sensor device. Robustness is a property necessary for preventing the occurrence of breakage or failure when the sensor device receives an external force.

Between them, regarding the sealability, in a sensor device in which electronic components are accommodated inside a housing, uniformly high sealability is required. On the other hand, regarding the robustness, there is a difference in the degree of robustness required according to a situation in which the sensor device is installed. Therefore, when high robustness is not particularly required, a resin housing is used, and when high robustness is required, a metal housing is used.

For example, in Japanese Unexamined Patent Application No. 2010-205454 (Patent Document 1), a transmission type photoelectric sensor in which a housing is made of a resin member is disclosed. In Japanese Unexamined Patent Application No. 2007-73417 (Patent Document 2), a reflection type photoelectric sensor in which a housing is made of a metal member is disclosed.

[Patent Document 1] Japanese Unexamined Patent Application No. 2010-205454
[Patent Document 2] Japanese Unexamined Patent Application No. 2007-73417

Here, it is necessary for a sealing treatment between an opening provided in a housing and a component which is disposed to cover the opening or pass through the opening to provide high sealability that can be maintained for a long time. The sealing treatment differs depending on whether the housing is made of a resin or a metal.

In general, a component which is disposed to cover an opening or pass through the opening is made of a resin in many cases. Therefore, when the housing is made of a resin, if the housing and the component are adhered to each other or fused, it is possible to ensure high sealability for a long time relatively easily. On the other hand, when the housing is made of a metal, if the housing and the component are adhered to each other, cracks and the like easily occur in an adhesive layer due to a difference in linear expansion coefficients thereof, and it is difficult to ensure high sealability for a long time. Therefore, it is necessary to ensure sealability by pressure contact through packing, thereby increasing the production costs.

In addition, when the housing is made of a metal, in order to reduce the number of parts on which a sealing treatment needs to be performed, the housing is divided into the two parts of a box-shaped housing main body in which openings for accommodating various components therein are provided and a lid that closes the opening, a welding treatment or the like is performed on a boundary between the housing main body and the lid, and thus sealability of the housing is ensured. However, in this case, it is necessary to produce the box-shaped housing main body by casting, metal injection molding (MIM), cutting, or the like, which is one cause of increase in the production costs.

SUMMARY

A sensor device according to one or some exemplary embodiments of the invention includes an inner housing made of resin which has an accommodating space therein and in which an opening is provided; an externally exposed part which is disposed to cover the opening or pass through the opening and at least a part of the externally exposed part is exposed to the outside of the inner housing; and an outer housing made of metal which is positioned outside the inner housing and accommodates the inner housing and covers the inner housing. A sealing treatment is performed between the inner housing and the externally exposed part, and the accommodating space is sealed off from a space outside the inner housing. A cut-off part is provided in the outer housing at a position corresponding to the part exposed to the outside of the inner housing of the externally exposed part, the at least a part of the externally exposed part is also exposed to the outside of the outer housing.

DESCRIPTION OF THE EMBODIMENTS

Figure 1:
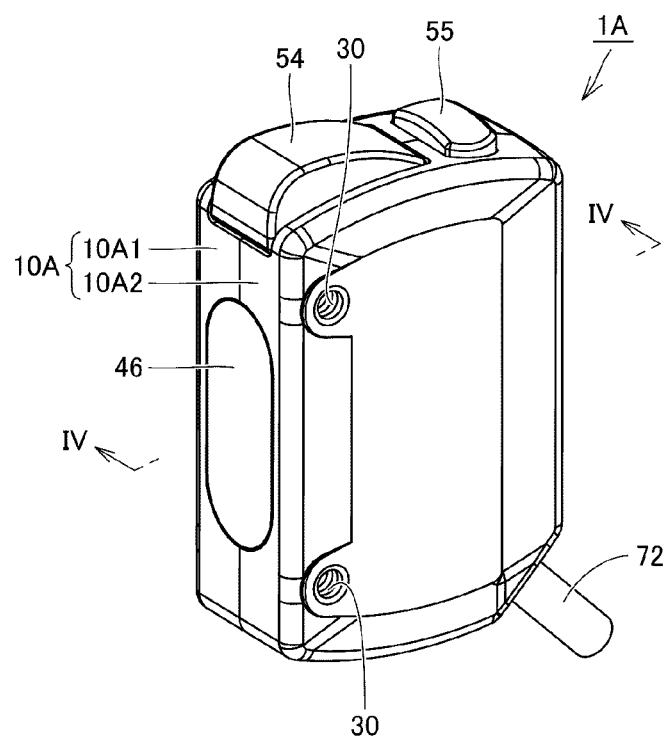
FIG. 1 is a schematic perspective view of a photoelectric sensor according to Embodiment 1 of the invention.

A sensor device having high sealability and high robustness that can be produced at low cost is provided.

A sensor device according to one or some exemplary embodiments of the invention includes a resin inner housing which includes an accommodating space therein and in which an opening is provided; an externally exposed part which is disposed to cover the opening or pass through the opening and of which at least a part is exposed to the outside of the inner housing; and a metal outer housing which is positioned outside the inner housing and accommodates the inner housing and covers the inner housing. When a sealing treatment is performed between the inner housing and the externally exposed part, the accommodating space is sealed off from a space outside the inner housing. When a cut-off part is provided in the outer housing at a position corresponding to the part exposed to the outside of the inner housing of the externally exposed part, the at least a part of the externally exposed part is also exposed to the outside of the outer housing.

In the sensor device according to one or some exemplary embodiments of the invention, the outer housing is formed by combining at least two or more divided segments.

In the sensor device according to one or some exemplary embodiments of the invention, each of the two or more divided segments is formed of a press molded product of a metal plate member.

In the sensor device according to one or some exemplary embodiments of the invention, a heat insulating layer is positioned between the outer housing and the inner housing.

The sensor device according to one or some exemplary embodiments of the invention may further include a fixed member made of metal that defines a screw hole for installing the sensor device by screw fastening. In this case, the fixed member is embedded in the inner housing so that the screw hole is exposed to the outside of the inner housing. In addition, in this case, when a cut-off part is provided at a position corresponding to the screw hole on the outer housing, the screw hole is also exposed to the outside of the outer housing.

In the sensor device according to one or some exemplary embodiments of the invention, the externally exposed part is at least one of a detection part, a display part, an operation part, and a cable drawing out part.

According to one or some exemplary embodiments of the invention, it is possible to provide a sensor device having high sealability and high robustness that can be produced at low cost.

Exemplary embodiments of the invention will be described below in detail with reference to the drawings. A case in which the invention is applied to a reflection type photoelectric sensor as a sensor device will be exemplified in the embodiments to be described below. Here, in the embodiments to be described below, the same or common parts will be denoted with the same reference numerals in the drawings, and descriptions thereof will not be repeated.

Embodiment 1

Figure 2:
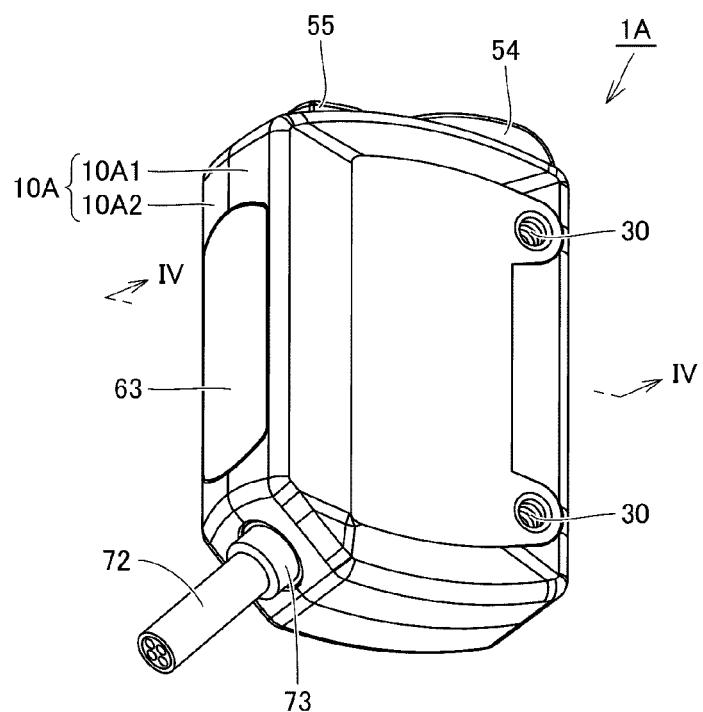
FIG. 2 is a schematic perspective view of the photoelectric sensor shown in FIG. 1 seen in another direction.

FIG. 1 and FIG. 2 are schematic perspective views of a photoelectric sensor according to Embodiment 1 of the invention. FIG. 1 is a view of the photoelectric sensor seen obliquely from the upper front side. FIG. 2 is a view seen obliquely from the lower rear side. First, an exterior structure of a photoelectric sensor 1A according to the present embodiment will be described with reference to FIG. 1 and FIG. 2.

As shown in FIG. 1 and FIG. 2, the photoelectric sensor 1A has a substantially rectangular parallelepiped exterior shape as a whole and an outer shell thereof is mainly constituted by an outer housing 10A. The outer housing 10A is made of a metal member and includes a right cover 10A1 and a left cover 10A2 as divided segments.

A plurality of cut-off parts having an opening shape are provided at predetermined positions on the outer housing 10A. Through the plurality of cut-off parts, a light projector and receiver 40, a display operation part 50, a sub-display part 60, and an input and output part 70 (refer to FIG. 4 and the like for all) as externally exposed parts to be described below are exposed to the outside of the outer housing 10A.

More specifically, on a front surface of the photoelectric sensor 1A, a translucent plate 46 which is a part of the light projector and receiver 40 is exposed. On an upper surface of the photoelectric sensor 1A, a first translucent member 54 and a push button 55 which are a part of the display operation part 50 are exposed. In addition, on a rear surface of the photoelectric sensor 1A, a second translucent member 63 which is a part of the sub-display part 60 is exposed. On a wall surface connecting the rear surface and a bottom surface of the photoelectric sensor 1A, a cable 72 and a bush 73 which are a part of the input and output unit 70 are exposed. Among them, a part of the cable 72 is drawn into the outer housing 10A and most of the cable 72 is drawn out to the outside of the outer housing 10A.

In addition, at predetermined positions on the photoelectric sensor 1A, a plurality of fixed members 30 in which screw holes for installing the photoelectric sensor 1A in various facilities (for example, a production facility) and the like by screw fastening are formed are provided. All of the plurality of fixed members 30 are made of a metal member. Cut-off parts are also provided in the outer housing 10A at positions corresponding to the plurality of fixed members 30. Therefore, the fixed member 30 is exposed to the outside of the outer housing 10A.

Here, for example, as shown in the drawing, two cut-off parts through which the fixed members 30 are exposed are provided in each of a part that defines the right side and a part that defines the left side of the photoelectric sensor 1A of the outer housing 10A giving a total of 4.

Figure 3:
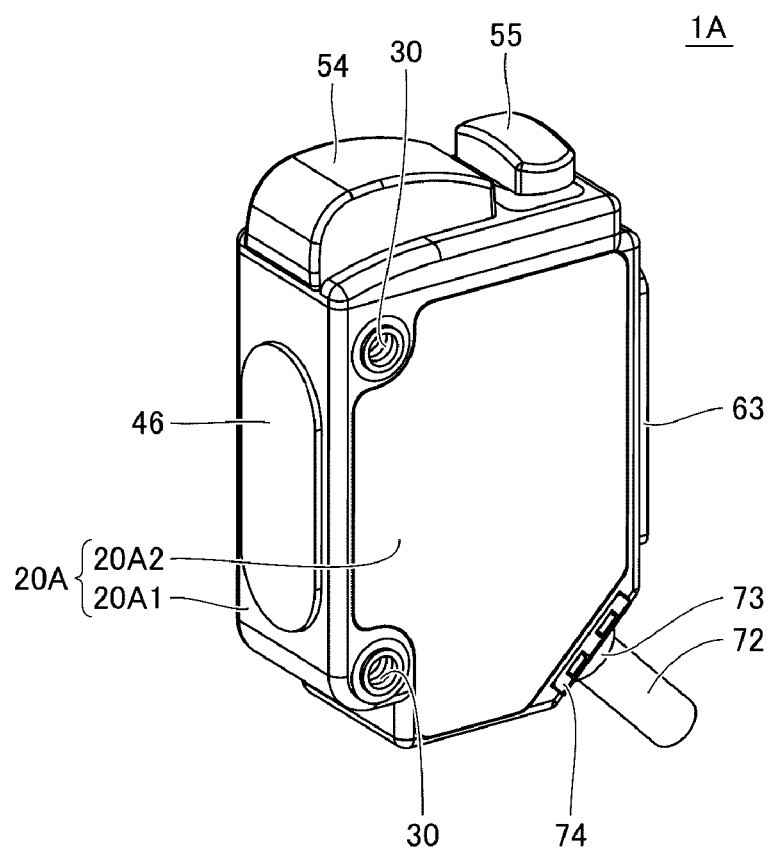
FIG. 3 is a schematic perspective view showing a state of an outer housing of the photoelectric sensor shown in FIG. 1 before assembly.

FIG. 3 is a schematic perspective view showing a state of an outer housing of the photoelectric sensor shown in FIG. 1 before assembly. Next, an exterior structure before the outer housing 10A of the photoelectric sensor 1A according to the present embodiment is assembled will be described with reference to FIG. 3.

As shown in FIG. 3, before the outer housing 10A is assembled, the photoelectric sensor 1A has a substantially rectangular parallelepiped exterior shape as a whole and an outer shell thereof is mainly constituted by an inner housing 20A. Inside the inner housing 20A, an accommodating space 20a (refer to FIG. 4 to FIG. 6) in which various constitutional components are accommodated is formed. The inner housing 20A is made of a resin member and includes a case main body 20A1 and a lid 20A2.

A plurality of openings are provided at predetermined positions on the inner housing 20A. In the vicinities of the plurality of openings, the light projector and receiver 40, the display operation part 50, the sub-display part 60, and the input and output part 70 (refer to FIG. 4 and the like for all) as externally exposed parts are positioned to cover the openings or pass through the openings. Therefore, the externally exposed parts are exposed to the outside of the inner housing 20A.

More specifically, the translucent plate 46 which is a part of the light projector and receiver 40 is exposed to a part corresponding to the front surface of the photoelectric sensor 1A of the inner housing 20A. The first translucent member 54 and the push button 55 which are a part of the display operation part 50 are exposed to a part corresponding to the upper surface of the photoelectric sensor 1A of the inner housing 20A. In addition, the second translucent member 63 which is a part of the sub-display part 60 is exposed to a part corresponding to the rear surface of the photoelectric sensor 1A of the inner housing 20A. The cable 72, the bush 73, and a fixing member 74 which are a part of the input and output part 70 are exposed to a part corresponding to the wall surface connecting the rear surface and the bottom surface of the photoelectric sensor 1A of the inner housing 20A. Among them, a part of the cable 72 is drawn into the inner housing 20A and most of the cable 72 is drawn out to the outside of the inner housing 20A.

In addition, the above-described plurality of fixed members 30 are embedded at predetermined positions on the inner housing 20A. Specifically, when the case main body 20A1 is produced by injection molding using a resin material, so-called insert molding by which the resin material is injected to surround the plurality of fixed members 30 is performed, and thus the plurality of fixed members 30 are embedded into the case main body 20A1.

Here, for example, as shown in the drawing, one of the fixed members 30 is provided at each of upper and lower positions on the inner housing 20A such that a total of 2 pass through a part corresponding to the part near the front surface of the right side and a part corresponding to the part near the front surface of the left side of the photoelectric sensor 1A. Accordingly, both ends of the plurality of fixed members 30 in the axial direction are exposed to the outside of the inner housing 20A.

In this manner, in the photoelectric sensor 1A according to the present embodiment, various constitutional components are assembled to the resin inner housing 20A, and the metal outer housing 10A is assembled to the inner housing 20A to cover the external surface of the resin inner housing 20A.

Here, as described above, the photoelectric sensor 1A includes a plurality of externally exposed parts (excluding the outer housing 10A here) of which at least a part is exposed on the external surface of the photoelectric sensor 1A, and a sealing treatment is performed between the resin inner housing 20A and the externally exposed part. On the other hand, as described above, the metal outer housing 10A includes a plurality of cut-off parts through which an externally exposed part is exposed and no special sealing treatment is performed between the outer housing 10A and the externally exposed part, between the outer housing 10A and the inner housing 20A, and between the right cover 10A1 and the left cover 10A2 constituting the outer housing 10A.

In such a configuration, the accommodating space formed inside the inner housing 20A is sealed off from the space outside the inner housing 20A, and at least a part of the externally exposed part which is disposed to cover the opening formed in the inner housing 20A or pass through the opening formed in the inner housing 20A is exposed to the outside of the outer housing 10A through the cut-off part provided in the outer housing 10A. Therefore, the photoelectric sensor 1A can have high sealability and high robustness.

Figure 4:
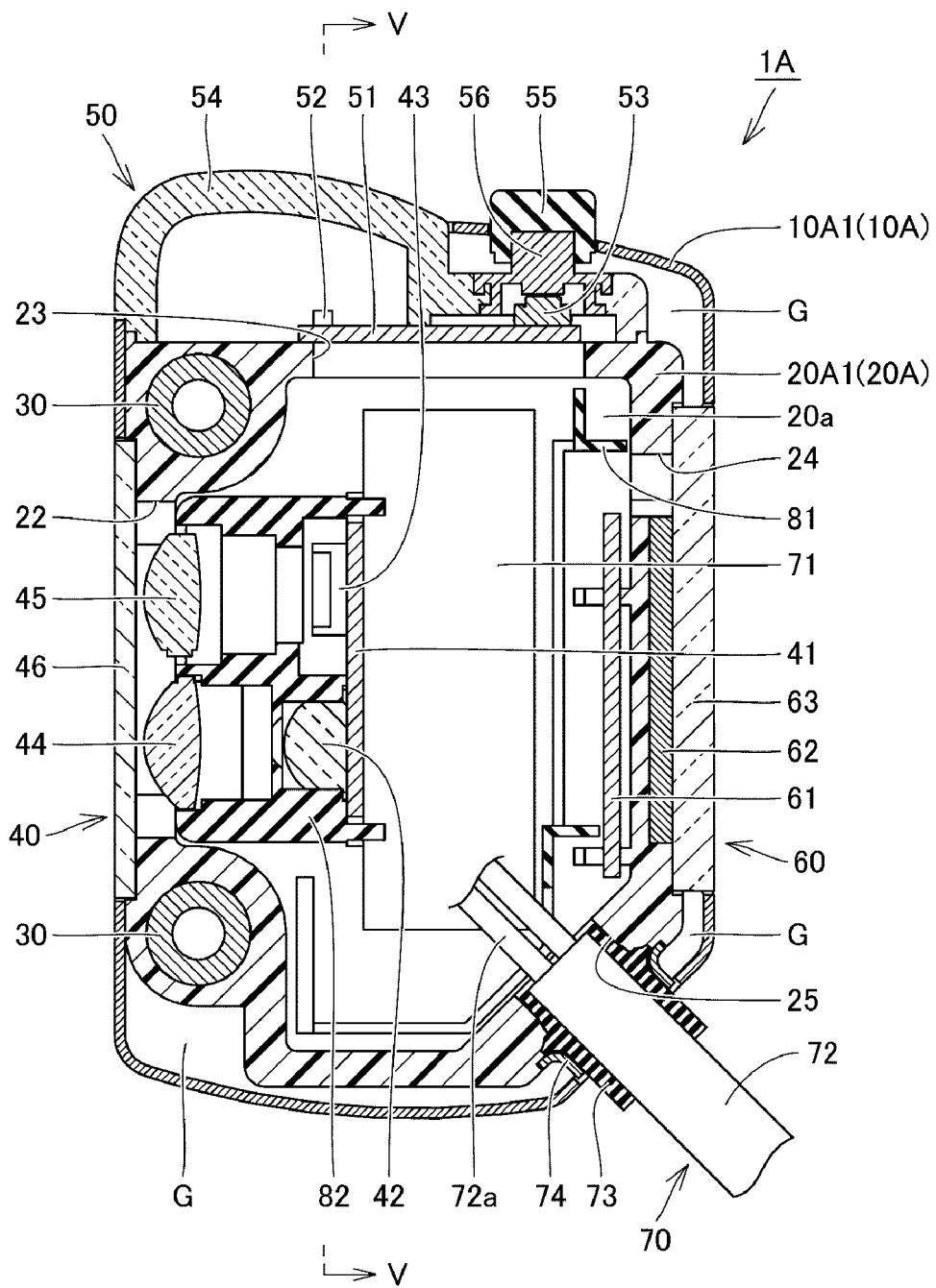
FIG. 4 is a schematic sectional view taken along the line IV-IV shown in FIG. 1 and FIG. 2.
Figure 5:
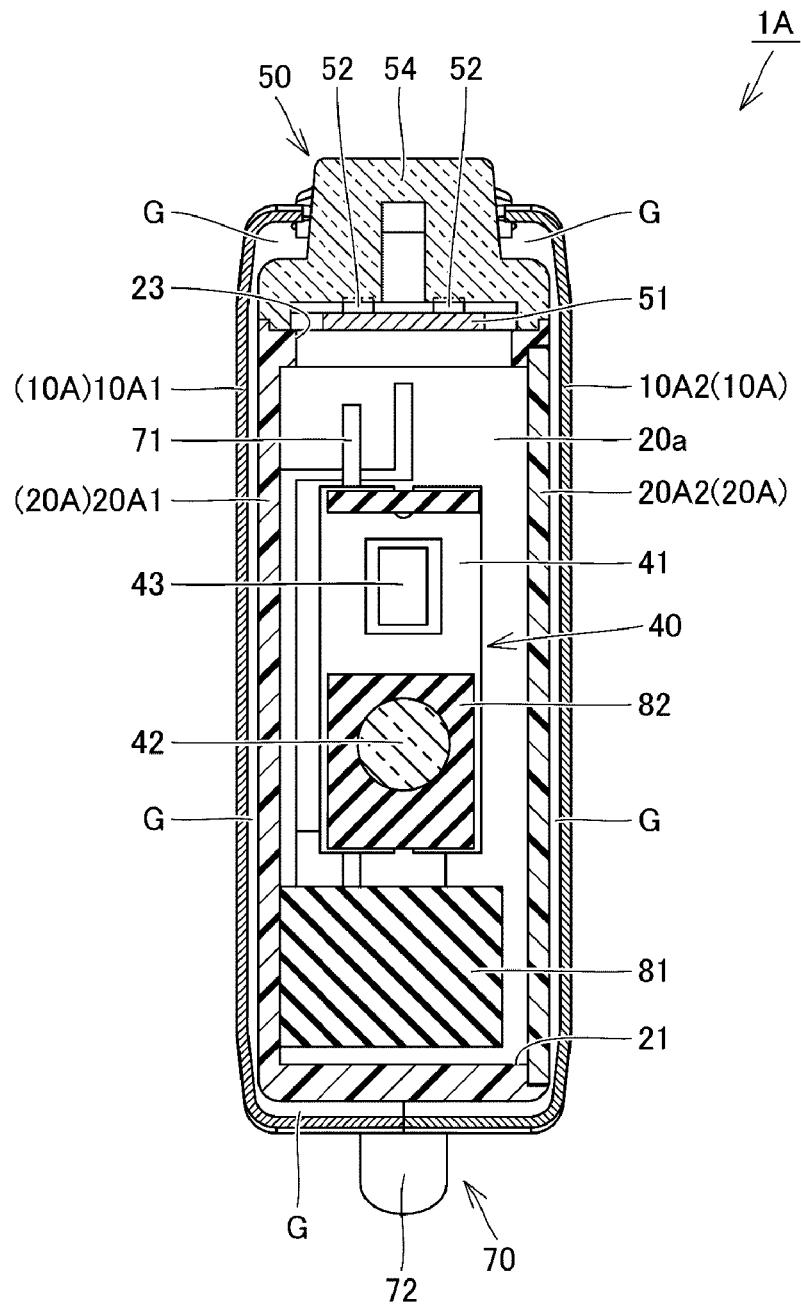
FIG. 5 is a schematic sectional view taken along the line V-V shown in FIG. 4.
Figure 6:
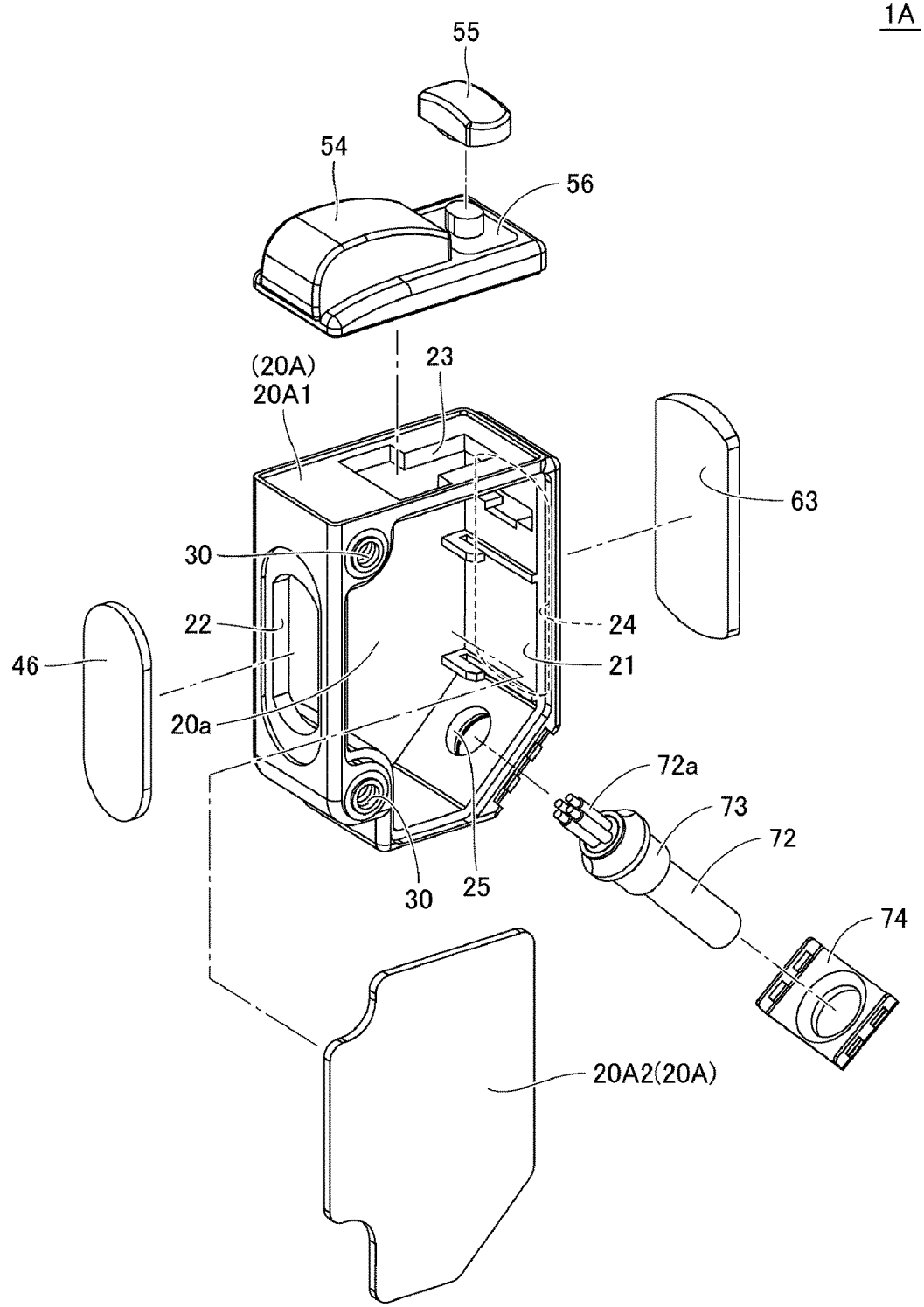
FIG. 6 is a schematic exploded view showing an assembling structure of an inner housing of the photoelectric sensor shown in FIG. 1 and an assembling structure of an externally exposed part in the inner housing.

FIG. 4 is a schematic sectional view taken along the line IV-IV shown in FIG. 1 and FIG. 2. FIG. 5 is a schematic sectional view taken along the line V-V shown in FIG. 4. In addition, FIG. 6 is a schematic exploded view of an assembling structure of the inner housing of the photoelectric sensor shown in FIG. 1 and an assembling structure of the externally exposed part in the inner housing. Next, a configuration of the outer housing 10A of the photoelectric sensor 1A according to the present embodiment, an assembling structure of the inner housing 20A, and an assembling structure of the externally exposed part in the inner housing 20A will be described with reference to FIG. 4 to FIG. 6, and FIG. 1 to FIG. 3 described above.

As shown in FIG. 1 to FIG. 6, the photoelectric sensor 1A includes the light projector and receiver 40 as a detection part, the display operation part 50, the sub-display part 60, the input and output part 70, and various brackets 81 and 82 in addition to the metal outer housing 10A, the resin inner housing 20A, and the metal fixed member 30 described above.

As described above, with reference to FIG. 1, FIG. 2, FIG. 4 and FIG. 5, the metal outer housing 10A has a substantially rectangular parallelepiped exterior shape as a whole and includes the right cover 10A1 and the left cover 10A2 as divided segments. The right cover 10A1 defines the right side of the photoelectric sensor 1A and has a substantially box shape that defines a part of each of the front surface, the rear surface, the upper surface, and the bottom surface of the photoelectric sensor 1A. The left cover 10A2 defines the left side of the photoelectric sensor 1A and has a substantially box shape that defines a part of each of the front surface, the rear surface, the upper surface, and the bottom surface of the photoelectric sensor 1A.

The right cover 10A1 and the left cover 10A2 are combined and bonded together so that openings face each other. Therefore, the outer housing 10A having a substantially rectangular parallelepiped exterior shape as a whole is formed by the right cover 10A1 and the left cover 10A2 as divided segments. Each of the right cover 10A1 and the left cover 10A2 is formed of a press molded product of a metal plate member made of, for example, stainless steel. Here, for example, welding or the like can be used for bonding the right cover 10A1 to the left cover 10A2.

With reference to FIG. 3 to FIG. 6, as described above, the resin inner housing 20A has a substantially rectangular parallelepiped exterior shape as a whole and includes the case main body 20A1 and the lid 20A2. The size of the inner housing 20A is slightly smaller than the size of the outer housing 10A. The case main body 20A1 has a substantially box shape that mainly includes walls at positions corresponding to the front surface, the rear surface, the upper surface, the bottom surface, and the right side of the photoelectric sensor 1A and includes a side opening 21 at a position corresponding to the left side of the photoelectric sensor 1A. The lid 20A2 has a substantially flat plate shape including a wall at a position corresponding to the left side of the photoelectric sensor 1A.

The lid 20A2 is bonded to the case main body 20A1 so that the side opening 21 of the case main body 20A1 is closed. Therefore, the inner housing 20A having a substantially rectangular parallelepiped exterior shape as a whole is formed by the case main body 20A1 and the lid 20A2, and the accommodating space 20a is formed inside the inner housing 20A. Through the side opening 21 provided in the case main body 20A1, various components are assembled inside the inner housing 20A. Each of the case main body 20A1 and the lid 20A2 is formed of an injection molded product using, for example, a resin material. Here, for example, adhesion, fusing or the like can be used for bonding the case main body 20A1 to the lid 20A2. Accordingly, it is possible to ensure sealability at this part.

As shown in FIG. 4 and FIG. 6, a first opening 22 is provided in the wall of the case main body 20A1 at a part corresponding to the front surface of the photoelectric sensor 1A. The first opening 22 is an opening through which a part of the light projector and receiver 40 is exposed to the outside.

The first opening 22 is covered with the translucent plate 46 which is a part of the light projector and receiver 40. Accordingly, the external surface of the translucent plate 46 is exposed to the outside of the inner housing 20A.

The translucent plate 46 is bonded to the case main body 20A1 so that the first opening 22 of the case main body 20A1 is closed. For example, adhesion, fusing or the like can be used for bonding the translucent plate 46 to the case main body 20A1. Accordingly, it is possible to ensure sealability at this part.

As shown in FIG. 4 and FIG. 5, the light projector and receiver 40 mainly includes a first circuit board 41, a light projecting element 42, a light receiving element 43, a light projecting lens 44, a light receiving lens 45, and the above-described translucent plate 46. The light projector and receiver 40 is mainly disposed in a part facing the first opening 22 within the accommodating space 20a of the inner housing 20A.

Specifically, the light projecting lens 44 and the light receiving lens 45 are disposed at positions behind the translucent plate 46 assembled to the inner housing 20A so that the first opening 22 is closed. In addition, the first circuit board 41 is disposed at a position behind the light projecting lens 44 and the light receiving lens 45.

On the main surface of the first circuit board 41 at a part facing the light projecting lens 44, for example, the light projecting element 42 including a semiconductor light emitting diode (LED), a semiconductor laser diode (LD), or the like is mounted. On the main surface of the first circuit board 41 at a part facing the light receiving lens 45, for example, the light receiving element 43 including a semiconductor photodiode (PD) or the like is mounted.

Accordingly, in the photoelectric sensor 1A, light emitted from the light projecting element 42 is emitted to the space outside the photoelectric sensor 1A through the light projecting lens 44 and the translucent plate 46, and its reflected light is received by the light receiving element 43 through the translucent plate 46 and the light receiving lens 45.

Here, the first circuit board 41 has front and rear surfaces on which a conductive pattern is formed and has various electronic components mounted thereon in addition to the light projecting element 42 and the light receiving element 43 described above. Accordingly, various electric circuits are provided in the first circuit board 41. The electric circuits include, for example, a light projecting element driving circuit configured to drive the light projecting element 42 and a signal processing circuit configured to photoelectrically convert light detected by the light receiving element 43 into a predetermined output signal.

Here, the first circuit board 41, the light projecting lens 44, and the light receiving lens 45 described above are kept in the accommodating space 20a by the bracket 81 or the like assembled inside the inner housing 20A.

As shown in FIG. 4 to FIG. 6, a second opening 23 is provided in the wall of the case main body 20A1 at a part corresponding to the upper surface of the photoelectric sensor 1A. The second opening 23 is an opening through which the display operation part 50 is exposed to the outside of the inner housing 20A and which is provided to electrically connect the display operation part 50 and other electronic components accommodated in the accommodating space 20a.

The second opening 23 is covered with the first translucent member 54 which is a part of the display operation part 50. Accordingly, the external surface of the first translucent member 54 is exposed to the outside of the inner housing 20A.

The first translucent member 54 is bonded to the case main body 20A1 so that the second opening 23 of the case main body 20A1 is closed. For example, adhesion, fusing or the like can be used for bonding the first translucent member 54 to the case main body 20A1. Accordingly, it is possible to ensure sealability at this part.

As shown in FIG. 4 and FIG. 5, the display operation part 50 mainly includes a second circuit board 51, a light emitting element 52, a switch 53, the above-described first translucent member 54, the push button 55, and a movable member 56. The display operation part 50 is mainly disposed in a part which is a space inside the outer housing 10A and faces the second opening 23 of the inner housing 20A.

Specifically, the second circuit board 51 is disposed at a position below the first translucent member 54 assembled to the inner housing 20A so that the second opening 23 is closed, and the light emitting element 52 and the switch 53 are mounted in the second circuit board 51 at a part facing the first translucent member 54. In addition, the movable member 56 and the push button 55 are disposed above the switch 53.

The light emitting element 52 includes, for example, a semiconductor light emitting diode, and notifies of an operation state of the photoelectric sensor 1A. The switch 53, the push button 55, and the movable member 56 integratedly constitute an operation button, and switch an operation state of the photoelectric sensor 1A. Here, the first translucent member 54 functions as a lens that protects the light emitting element 52 and the switch 53 and diffuses light while the light emitted from the light emitting element 52 can be visually observed from the outside.

Here, the second circuit board 51 has front and rear surfaces on which a conductive pattern is formed and has various electronic components mounted thereon in addition to the light emitting element 52 and the switch 53 described above. Accordingly, various electric circuits are provided in the second circuit board 51. The electric circuits include, for example, a light emitting element driving circuit configured to drive the light emitting element 52 and a switching circuit configured to receive an operation of an operation button and switch an operation of the photoelectric sensor 1A.

As shown in FIG. 4 and FIG. 6, a third opening 24 is provided in the wall of the case main body 20A1 at a part corresponding to the rear surface of the photoelectric sensor 1A. The third opening 24 is an opening through which a part of the sub-display part 60 is exposed to the outside.

The third opening 24 is covered with the second translucent member 63 which is a part of the sub-display part 60. Accordingly, the external surface of the second translucent member 63 is exposed to the outside of the inner housing 20A.

The second translucent member 63 is bonded to the case main body 20A1 so that the third opening 24 of the case main body 20A1 is closed. For example, adhesion, fusing or the like can be used for bonding the second translucent member 63 to the case main body 20A1. Accordingly, it is possible to ensure sealability at this part.

As shown in FIG. 4, the sub-display part 60 mainly includes a third circuit board 61, a display element 62, and the above-described second translucent member 63. The sub-display part 60 is mainly disposed in a part facing the third opening 24 within the accommodating space 20a of the inner housing 20A.

Specifically, the display element 62 is disposed at a position in front of the second translucent member 63 assembled to the inner housing 20A so that the third opening 24 is closed. In addition, the third circuit board 61 is disposed at a position in front of the display element 62.

The display element 62 includes, for example, a liquid crystal display or an organic EL display, notifies of an operation state of the photoelectric sensor 1A, and displays a setting state. Here, the second translucent member 63 protects the display element 62 and transmits light so that the light emitted from the display element 62 can be visually observed from the outside.

Here, the third circuit board 61 has front and rear surfaces on which a conductive pattern is formed, is electrically connected to the display element 62 described above, and has various electronic components mounted thereon. Accordingly, various electric circuits are provided in the third circuit board 61. The electric circuits include, for example, a display element driving circuit configured to drive the display element 62.

Here, the third circuit board 61 and the display element 62 described above are kept in the accommodating space 20a by the locking part provided inside the inner housing 20A, the bracket 81 assembled inside the inner housing 20A, and the like.

As shown in FIG. 4 and FIG. 6, a fourth opening 25 is provided in the wall of the case main body 20A1 at a part corresponding to the wall surface connecting the rear surface and the bottom surface of the photoelectric sensor 1A. The fourth opening 25 is an opening through which a part of the input and output part 70 is exposed to the outside.

In the fourth opening 25, the cable 72 and the bush 73 which are a part of the input and output part 70 are disposed to pass therethrough. Accordingly, the cable 72 and the bush 73 of the part drawn out from the inner housing 20A are exposed to the outside of the inner housing 20A.

The fixing member 74 made of a metal plate member is attached to the inner housing 20A to surround the cable 72 and the bush 73 inserted into the fourth opening 25. Accordingly, a flange provided on the bush 73 is interposed between the fixing member 74 and the inner housing 20A, and the bush 73 deforms and a gap between the cable 72 and the inner housing 20A is sealed off. Accordingly, it is possible to ensure sealability at this part. Here, when the fixing member 74 is fixed to the inner housing 20A, for example, a snap-fit can be used.

As shown in FIG. 4, the input and output part 70 mainly includes a fourth circuit board 71, the above-described cable 72, the above-described bush 73, and the above-described fixing member 74. The input and output part 70 is mainly disposed in a part facing the fourth opening 25 within the accommodating space 20a of the inner housing 20A and a part which is a space inside the outer housing 10A and faces the fourth opening 25 of the inner housing 20A.

Specifically, the fourth circuit board 71 is disposed at a position adjacent to the fourth opening 25 within the accommodating space 20a of the inner housing 20A. The cable 72 of a part drawn into the accommodating space 20a of the inner housing 20A through the fourth opening 25 is connected to the fourth circuit board 71. More specifically, the cable 72 is a composite cable including a plurality of core wires 72a having a conductive wire and a shielding material and a sheath that covers them. When the conductive wire included in the core wires of the cable 72 is bonded to a land provided on the fourth circuit board 71 by soldering or the like, the cable 72 is connected to the fourth circuit board 71.

Here, the fourth circuit board 71 has front and rear surfaces on which a conductive pattern is formed, is electrically connected to the cable 72 described above, and has various electronic components mounted thereon. Accordingly, various electric circuits are provided on the fourth circuit board 71. The electric circuits include, for example, a power supply circuit configured to convert power supplied from the outside into a predetermined power supply specification and output the converted result.

Here, the above-described fourth circuit board 71 is kept in the accommodating space 20a by the locking part or the like provided inside the inner housing 20A.

Here, although details are not described, the first circuit board 41, the second circuit board 51, the third circuit board 61, and the fourth circuit board 71 described above are connected to each other by a flexible wiring board (not shown) or the like. Accordingly, the above-described various circuits are electrically connected, and functions of the photoelectric sensor 1A are exhibited.

Figure 7:
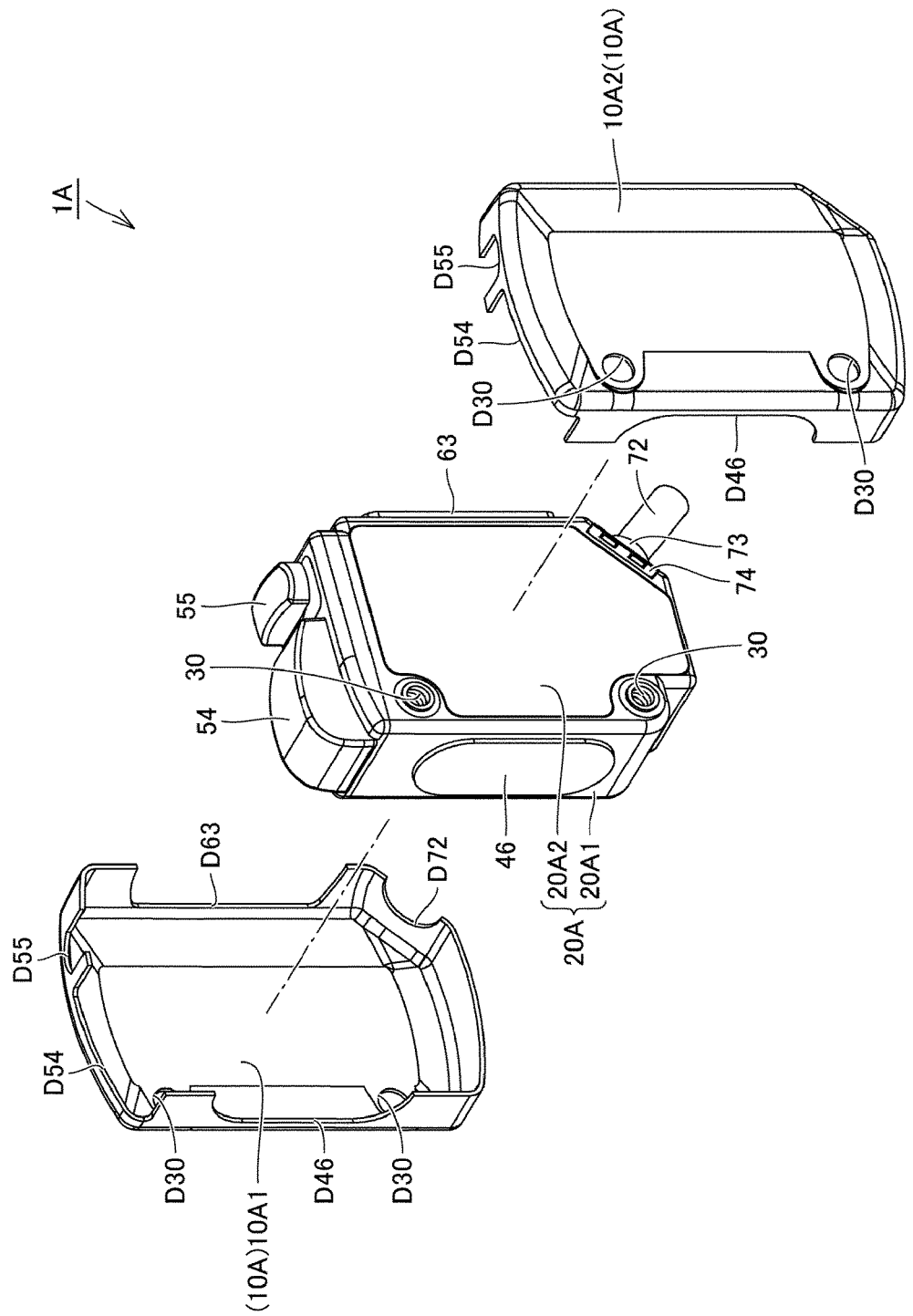
FIG. 7 is a schematic exploded view of an assembling structure of the outer housing of the photoelectric sensor shown in FIG. 1.

FIG. 7 is a schematic exploded view showing an assembling structure of the outer housing of the photoelectric sensor shown in FIG. 1. Next, an assembling structure of the outer housing 10A of the photoelectric sensor 1A according to the present embodiment will be described in detail with reference to FIG. 7.

As shown in FIG. 7, the right cover 10A1 and the left cover 10A2 constituting the outer housing 10A are combined and bonded together and the inner housing 20A in which various constitutional components are assembled in advance is interposed therebetween in the horizontal direction, and the bonding is performed by, for example, performing a welding treatment on the entire circumference or a part of an abutting part between the right cover 10A1 and the left cover 10A2. Here, when the welding treatment is performed on a part of the abutting part between the right cover 10A1 and the left cover 10A2, a junction may be provided at least on each of the front surface, the rear surface, the upper surface, and the bottom surface of the photoelectric sensor 1A.

Here, the right cover 10A1 and the left cover 10A2 each have a cut-off part D46 having a notch shape in a part that defines the front surface of the photoelectric sensor 1A. The cut-off part D46 is a cut-off part having an opening shape that is slightly larger than the outer shape of the translucent plate 46 and in combination therewith allows the translucent plate 46 to be exposed to the outside of the outer housing 10A.

In addition, the right cover 10A1 and the left cover 10A2 each have cut-off parts D54 and D55 having a notch shape in a part that defines the upper surface of the photoelectric sensor 1A. The cut-off parts D54 and D55 are cut-off parts having an opening shape that is slightly larger than the outer shape of the first translucent member 54 and the push button 55 and in combination therewith allow the first translucent member 54 and the push button 55 to be exposed to the outside of the outer housing 10A.

In addition, the right cover 10A1 and the left cover 10A2 each have a cut-off part D63 having a notch shape in a part that defines the rear surface of the photoelectric sensor 1A. The cut-off part D63 is a cut-off part having an opening shape that is slightly larger than the outer shape of the second translucent member 63 and in combination therewith allows the second translucent member 63 to be exposed to the outside of the outer housing 10A.

In addition, the right cover 10A1 and the left cover 10A2 each have a cut-off part D72 having a notch shape in a part that defines the wall connecting the rear surface and the bottom surface of the photoelectric sensor 1A. The cut-off part D72 is a cut-off part having an opening shape that is slightly larger than the outer shape of the cable 72 and the bush 73 and in combination therewith allows the cable 72 and the bush 73 to be exposed to the outside of the outer housing 10A.

Further, a cut-off part D30 having an opening shape is provided in a part that defines the right side of the photoelectric sensor 1A of the right cover 10A1 and a part that defines the left side of the photoelectric sensor 1A of the left cover 10A2. The cut-off part D30 is a cut-off part that is slightly larger than the screw hole of the fixed member 30 and allows the screw hole of the fixed member 30 to be exposed to the outside of the outer housing 10A.

When the photoelectric sensor 1A according to the present embodiment described above is used, it is sufficient to perform a sealing treatment necessary for ensuring sealability between the resin inner housing 20A and the resin externally exposed part, and it is not necessary to perform a special sealing treatment between the metal outer housing 10A and the resin externally exposed part and between the metal outer housing 10A and the resin inner housing 20A. Therefore, when the inner housing 20A and the externally exposed part are adhered or fused, it is possible to ensure high sealability for a long time relatively easily.

On the other hand, when the above configuration is used, the metal outer housing 10A is provided and thus the photoelectric sensor 1A can have high robustness. In addition, the metal outer housing 10A need not be produced by casting, metal injection molding, cutting, and the like, and can be made of a press molded product.

Therefore, when the photoelectric sensor 1A according to the present embodiment is used, it is possible to provide a photoelectric sensor having high sealability and high robustness that can be produced at low cost.

Here, when the above configuration is used, as shown in FIG. 4 and FIG. 5, when a gap G is provided between the outer housing 10A and the inner housing 20A, a heat insulating layer is formed on the entire photoelectric sensor 1A. Therefore, when the heat insulating layer is formed, it is possible to significantly reduce a thermal influence due to a rapid change in temperature of an external environment on the photoelectric sensor 1A.

Embodiment 2

Figure 8:
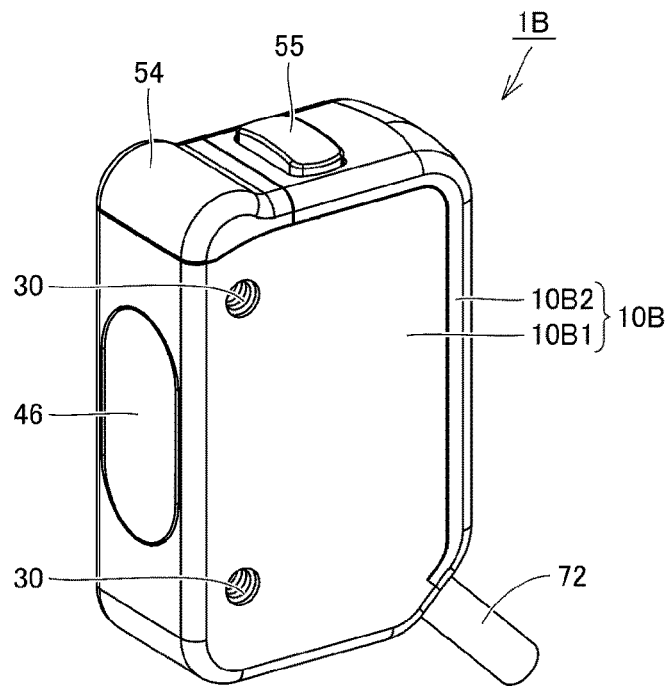
FIG. 8 is a schematic perspective view of a photoelectric sensor according to Embodiment 2 of the invention.
Figure 9:
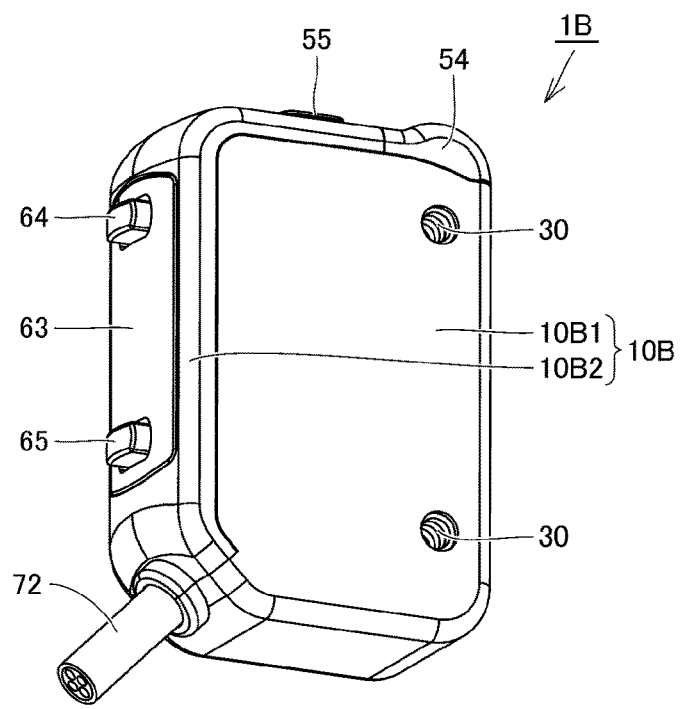
FIG. 9 is a schematic perspective view of the photoelectric sensor shown in FIG. 8 seen in another direction.
Figure 10:
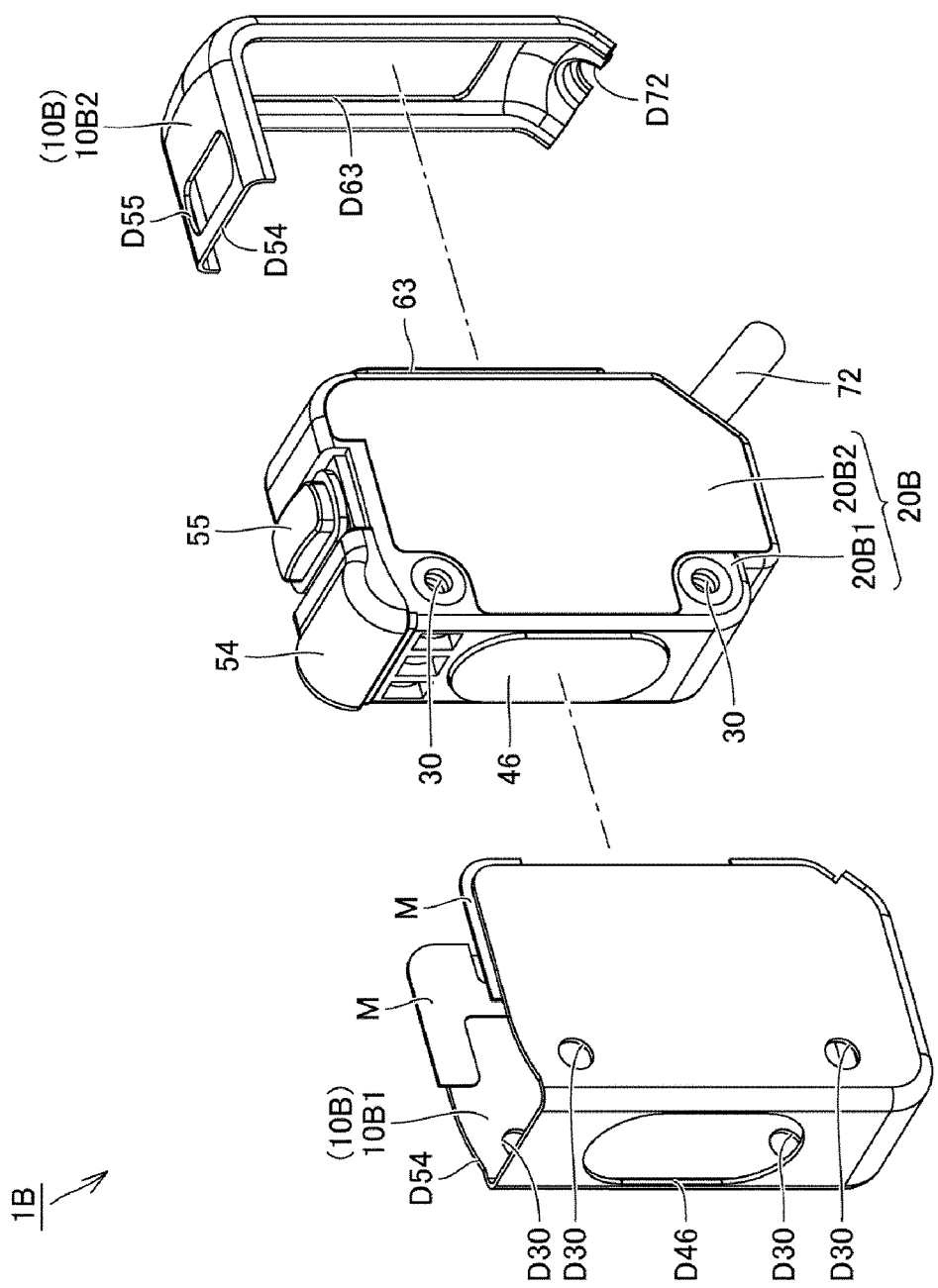
FIG. 10 is a schematic exploded view showing an assembling structure of the outer housing of the photoelectric sensor shown in FIG. 8.

FIG. 8 and FIG. 9 are schematic perspective views of a photoelectric sensor according to Embodiment 2 of the invention. FIG. 8 is a view of the photoelectric sensor seen obliquely from the upper front side. FIG. 9 is a view seen obliquely from the lower rear side. In addition, FIG. 10 is a schematic exploded view showing an assembling structure of an outer housing of the photoelectric sensor shown in FIG. 8. A photoelectric sensor 1B according to the present embodiment will be described below with reference to FIG. 8 to FIG. 10.

As shown in FIG. 8 to FIG. 10, the main differences between the photoelectric sensor 1B according to the present embodiment and the photoelectric sensor 1A according to Embodiment 1 described above are the configuration of the outer housing and a configuration of an externally exposed part provided on a rear surface which is also different. Here, in addition to these differences, there are many configurational differences in details, but basically the configuration is the same.

The photoelectric sensor 1B mainly includes a metal outer housing 10B, a resin inner housing 20B, the metal fixed member 30, the translucent plate 46 which is a part of the light projector and receiver as a detection part, the first translucent member 54 and the push button 55 which are a part of the display operation part, the second translucent member 63 and push buttons 64 and 65 which are a part of a sub-display operation part, and the cable 72 which is a part of the input and output part. Among them, the push buttons 64 and 65 switch an operation state of the photoelectric sensor 1B, switch a setting state, and/or switch a display state of a display part within a sub-operation display part.

The outer housing 10B includes a front cover 10B1 and a rear cover 10B2 as segments. The inner housing 20B includes a case main body 20B1 and a lid 20B2. The inner housing 20B includes an accommodating space therein, and various constitutional components (that is, various components constituting the light projector and receiver, the display operation part, the sub-display operation part and the input and output part described above) are assembled in the inner housing 20B. The outer housing 10B is assembled to the inner housing 20B to cover the external surface of the inner housing 20B.

A plurality of openings are provided at predetermined positions on the inner housing 20B. In the vicinities of the plurality of openings, the light projector and receiver, the display operation part, the sub-display operation part and the input and output part described above as externally exposed parts are positioned to cover the openings or pass through the openings. Therefore, the externally exposed parts are exposed to the outside of the inner housing 20B.

A plurality of cut-off parts having an opening shape are provided at predetermined positions on the outer housing 10B. The light projector and receiver, the display operation part, the sub-display operation part, and the input and output part described above as externally exposed parts are exposed to the outside of the outer housing 10B through the plurality of cut-off parts.

As described above, the metal outer housing 10B includes the front cover 10B1 and the rear cover 10B2 as divided segments. The front cover 10B1 defines a front surface, a bottom surface, a right side and a left side of a photoelectric sensor 1B. The rear cover 10B2 defines a rear surface and an upper surface of the photoelectric sensor 1B. In addition, the front cover 10B1 further includes an auxiliary bonding member M as a bonding margin. The auxiliary bonding member M is a metal plate member that is adhered to an inner surface side of the front cover 10B1 by, for example, welding, and has an end that protrudes from the front cover 10B1 so that the above-described bonding margin is formed.

As shown in FIG. 10, the front cover 10B1 and the rear cover 10B2 constituting the outer housing 10B are combined and bonded together and the inner housing 20B in which various constitutional components are assembled in advance is interposed therebetween in the longitudinal and vertical directions. The bonding is performed by, for example, performing a welding treatment on the entire circumference or a part of an abutting part between the front cover 10B1 and the rear cover 10B2.

Here, the cut-off part D46 having an opening shape is provided in a part that defines the front surface of the photoelectric sensor 1B of the front cover 10B1. The cut-off part D46 is a cut-off part that is slightly larger than the outer shape of the translucent plate 46 and allows the translucent plate 46 to be exposed to the outside of the outer housing 10B.

In addition, the cut-off part D54 having a notch shape is provided in a part that defines the front surface, the right side, and the left side of the photoelectric sensor 1B of the front cover 10B1 and a part that defines the upper surface of the photoelectric sensor 1B of the rear cover 10B2. The cut-off part D54 is a cut-off part having an opening shape that is slightly larger than the outer shape of the first translucent member 54 and in combination therewith allows the first translucent member 54 to be exposed to the outside of the outer housing 10B.

In addition, the cut-off part D55 having an opening shape is provided in a part that defines the upper surface of the photoelectric sensor 1B of the rear cover 10B2. The cut-off part D55 is a cut-off part that is slightly larger than the outer shape of the push button 55 and allows the push button 55 to be exposed to the outside of the outer housing 10B.

In addition, the cut-off part D63 having an opening shape is provided in a part that defines the rear surface of the photoelectric sensor 1B of the rear cover 10B2. The cut-off part D63 is a cut-off part that is slightly larger than the outer shape of the second translucent member 63 and allows the second translucent member 63 and the push buttons 64 and 65 to be exposed to the outside of the outer housing 10B.

In addition, the front cover 10B1 and the rear cover 10B2 each have the cut-off part D72 having a notch shape in a part that defines the wall connecting the rear surface and the bottom surface of the photoelectric sensor 1B. The cut-off part D72 is a cut-off part having an opening shape that is slightly larger than the outer shape of the cable 72 and in combination therewith allows the cable 72 to be exposed to the outside of the outer housing 10B.

Further, the cut-off part D30 having an opening shape is provided in a part that defines the right side and a part that defines the left side of the photoelectric sensor 1B of the front cover 10B1. The cut-off part D30 is a cut-off part that is slightly larger than the screw hole of the fixed member 30 and allows the screw hole of the fixed member 30 to be exposed to the outside of the outer housing 10B.

Also if the photoelectric sensor 1B according to the present embodiment described above is used, it is possible to obtain the same effects as those described in Embodiment 1 described above and it is possible to provide a photoelectric sensor having high sealability and high robustness that can be produced at low cost.

Embodiment 3

Figure 11:
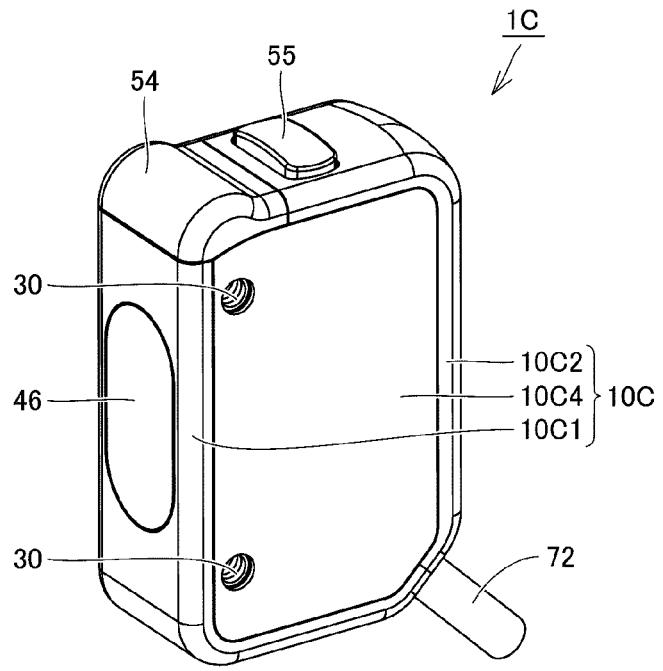
FIG. 11 is a schematic perspective view of a photoelectric sensor according to Embodiment 3 of the invention.
Figure 12:
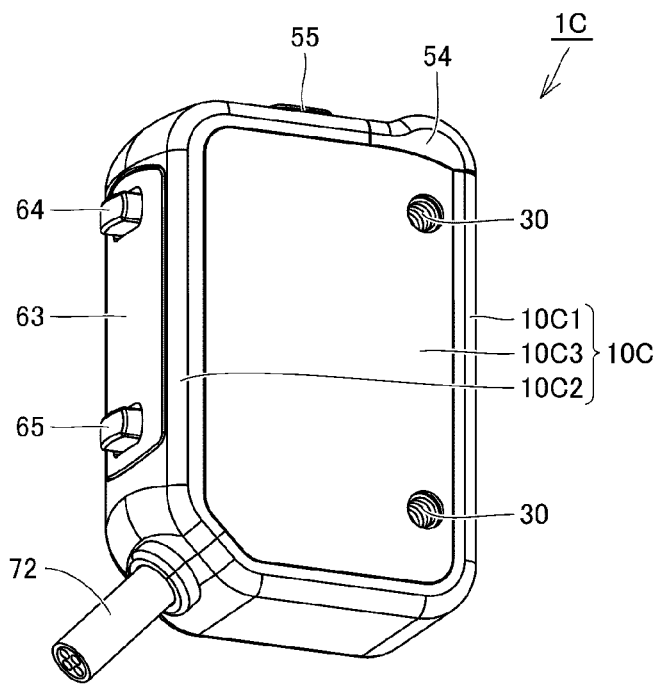
FIG. 12 is a schematic perspective view of the photoelectric sensor shown in FIG. 11 seen in another direction.
Figure 13:
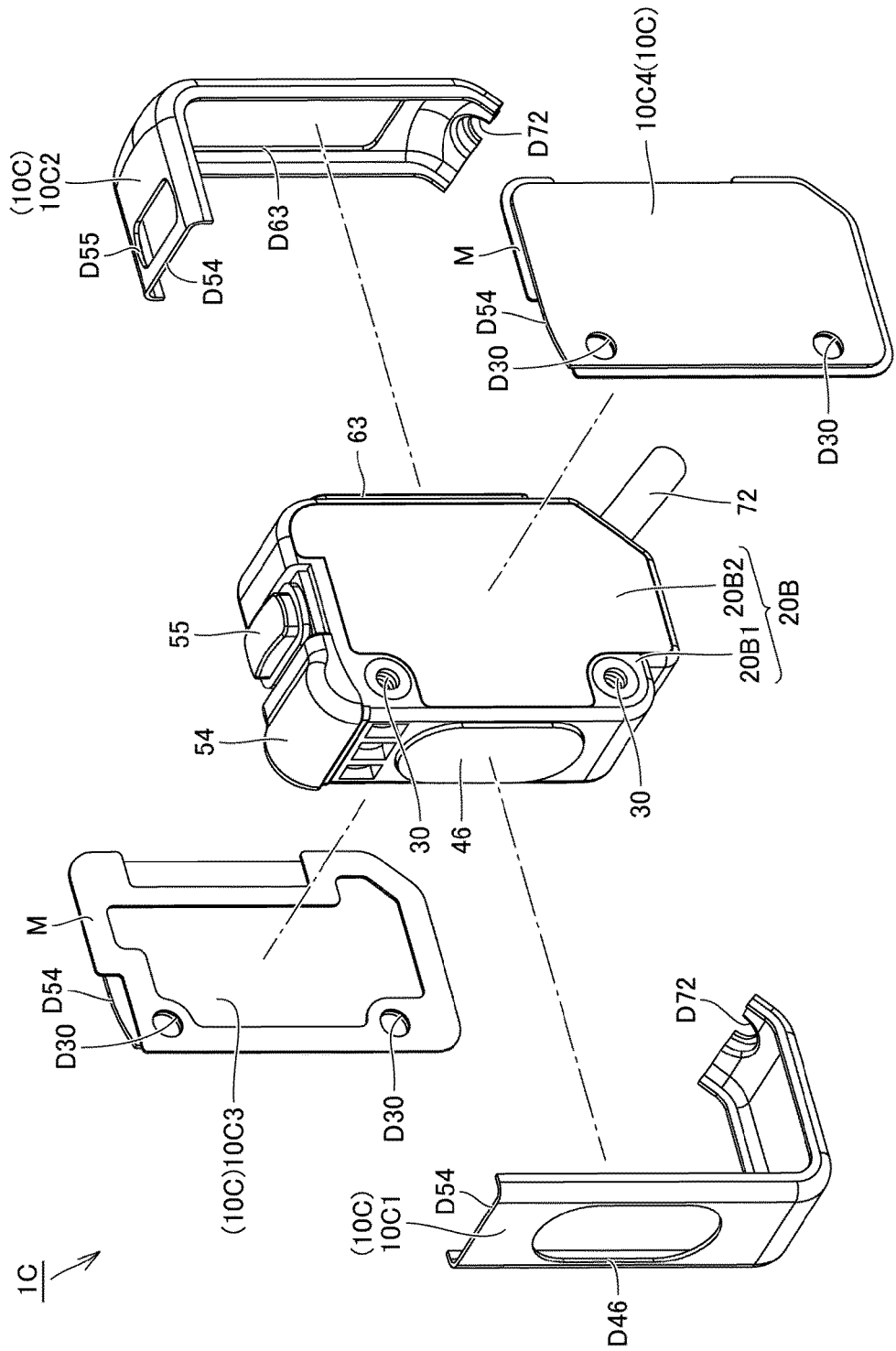
FIG. 13 is a schematic exploded view showing an assembling structure of an outer housing of the photoelectric sensor shown in FIG. 11.

FIG. 11 and FIG. 12 are schematic perspective views of a photoelectric sensor according to Embodiment 3 of the invention. FIG. 11 is a view of the photoelectric sensor seen obliquely from the upper front side. FIG. 12 is a view seen obliquely from the lower rear side. In addition, FIG. 13 is a schematic exploded view showing an assembling structure of an outer housing of the photoelectric sensor shown in FIG. 11. A photoelectric sensor 1C according to the present embodiment will be described below with reference to FIG. 11 to FIG. 13.

As shown in FIG. 11 to FIG. 13, the photoelectric sensor 1C according to the present embodiment is different from the photoelectric sensor 1B according to Embodiment 2 described above. The only difference is a configuration of an outer housing.

An outer housing 10C includes a front cover 10C1, a rear cover 10C2, a right cover 10C3, and a left cover 10C4 as divided segments. The front cover 10C1 defines a front surface and a bottom surface of the photoelectric sensor 1C. The rear cover 10C2 defines a rear surface and an upper surface of the photoelectric sensor 1C. The right cover 10C3 defines the right side of the photoelectric sensor 1C and the left cover 10C4 defines the left side of the photoelectric sensor 1C. In addition, the right cover 10C3 and the left cover 10C4 further include the auxiliary bonding member M as a bonding margin.

As shown in FIG. 13, the front cover 10C1, the rear cover 10C2, the right cover 10C3, and the left cover 10C4 constituting the outer housing 10C are combined and bonded together and the inner housing 20B in which various constitutional components are assembled in advance is interposed therebetween in longitudinal, vertical and horizontal directions. The bonding is performed by, for example, performing a welding treatment on the entire circumference or a part of abutting parts between the front cover 10C1, the rear cover 10C2, the right cover 10C3, and the left cover 10C4.

Here, the cut-off part D46 having an opening shape is provided in a part that defines the front surface of the photoelectric sensor 1C of the front cover 10C1. The cut-off part D46 is a cut-off part that is slightly larger than the outer shape of the translucent plate 46 and allows the translucent plate 46 to be exposed to the outside of the outer housing 10C.

In addition, the cut-off part D54 having a notch shape is provided in a part that defines the front surface of the photoelectric sensor 1C of the front cover 10C1, a part that defines the upper surface of the photoelectric sensor 1C of the rear cover 10C2, a part that defines the right side of the photoelectric sensor 1C of the right cover 10C3, and a part that defines the left side of the photoelectric sensor 1C of the left cover 10C4. The cut-off part D54 is a cut-off part having an opening shape that is slightly larger than the outer shape of the first translucent member 54 and in combination therewith allows the first translucent member 54 to be exposed to the outside of the outer housing 10C.

In addition, the cut-off part D55 having an opening shape is provided in a part that defines the upper surface of the photoelectric sensor 1C of the rear cover 10C2. The cut-off part D55 is a cut-off part that is slightly larger than the outer shape of the push button 55 and allows the push button 55 to be exposed to the outside of the outer housing 10C.

In addition, the cut-off part D63 having an opening shape is provided in a part that defines the rear surface of the photoelectric sensor 1C of the rear cover 10C2. The cut-off part D63 is a cut-off part that is slightly larger than the outer shape of the second translucent member 63 and allows the second translucent member 63 and the push buttons 64 and 65 to be exposed to the outside of the outer housing 10C.

In addition, the front cover 10C1 and the rear cover 10C2 each have the cut-off part D72 having a notch shape in a part that defines the wall connecting the rear surface and the bottom surface of the photoelectric sensor 1C. The cut-off part D72 is a cut-off part having an opening shape that is slightly larger than the outer shape of the cable 72 and in combination therewith allows the cable 72 to be exposed to the outside of the outer housing 10C.

Further, the cut-off part D30 having an opening shape is provided in a part that defines the right side of the photoelectric sensor 1C of the right cover 10C3 and a part that defines the left side of the photoelectric sensor 1C of the left cover 10C4. The cut-off part D30 is a cut-off part that is slightly larger than the screw hole of the fixed member 30 and allows the screw hole of the fixed member 30 to be exposed to the outside of the outer housing 10C.

Also if the photoelectric sensor 1C according to the present embodiment described above is used, it is possible to obtain the same effects as those described in Embodiment 1 described above and it is possible to provide a photoelectric sensor having high sealability and high robustness that can be produced at low cost.

Other Embodiments

While a case in which the outer housing is formed by combining divided segments has been exemplified in Embodiments 1 to 3 according to the invention described above, the outer housing can be formed by a non-divided member (that is, a single member, for example, a box-shaped housing) in which an inner housing can be accommodated.

In addition, while a case in which the outer housing is formed by welding divided segments to each other has been exemplified in Embodiments 1 to 3 according to the invention described above, divided segments can be bonded together by other methods. As other methods, for example, fastening, fitting, adhering, or a combination thereof can be used.

In addition, while a case in which the invention is applied to the reflection type photoelectric sensor has been exemplified in Embodiments 1 to 3 according to the invention described above, applications of the invention are not limited thereto, and the invention can be applied to other types of photoelectric sensors and naturally sensor devices other than a photoelectric sensor.

In addition, while a case in which the invention is applied to the sensor device including the light projector and receiver as a detection part, the display part, the operation part, and the input and output part as a cable drawing out part has been exemplified in Embodiments 1 to 3 according to the invention described above, the invention can be applied to a sensor device including only one among these components.

Therefore, the embodiments disclosed here are only examples and should not be considered as restrictive. The scope of the invention is defined by the appended claims and encompasses equivalents of the scope of the appended claims and all modifications falling with the scope of the appended claims.

What is claimed is:

1. A sensor device comprising:
    an inner housing made of resin which has an accommodating space therein and in which an opening is provided;
    an externally exposed part which is disposed to cover the opening or pass through the opening and at least a part of the externally exposed part is exposed to the outside of the inner housing; and
    an outer housing made of metal which is positioned outside the inner housing and accommodates the inner housing and covers the inner housing,
    wherein, a sealing treatment is performed between the inner housing and the externally exposed part, and the accommodating space is sealed off from a space outside the inner housing, and
    wherein, a first cut-off part is provided in the outer housing at a position corresponding to the part exposed to the outside of the inner housing of the externally exposed part, the at least a part of the externally exposed part is also exposed to the outside of the outer housing.

2. The sensor device according to claim 1,
    wherein the outer housing is formed by combining at least two or more divided segments.

3. The sensor device according to claim 2,
    wherein each of the two or more divided segments is formed of a press molded product of a metal plate member.

4. The sensor device according to claim 1,
    wherein a heat insulating layer is positioned between the outer housing and the inner housing.

5. The sensor device according to claim 2,
    wherein a heat insulating layer is positioned between the outer housing and the inner housing.

6. The sensor device according to claim 3,
    wherein a heat insulating layer is positioned between the outer housing and the inner housing.

7. The sensor device according to claim 1, further comprising:
    a fixed member made of metal that defines a screw hole for installing the sensor device by screw fastening,
    wherein the fixed member is buried in the inner housing so that the screw hole is exposed to the outside of the inner housing, and
    wherein, a second cut-off part is provided at a position corresponding to the screw hole on the outer housing, and the screw hole is also exposed to the outside of the outer housing.

8. The sensor device according to claim 2, further comprising:
    a fixed member made of metal that defines a screw hole for installing the sensor device by screw fastening,
    wherein the fixed member is buried in the inner housing so that the screw hole is exposed to the outside of the inner housing, and
    wherein, a second cut-off part is provided at a position corresponding to the screw hole on the outer housing, and the screw hole is also exposed to the outside of the outer housing.

9. The sensor device according to claim 3, further comprising:
    a fixed member made of metal that defines a screw hole for installing the sensor device by screw fastening,
    wherein the fixed member is buried in the inner housing so that the screw hole is exposed to the outside of the inner housing, and
    wherein, a second cut-off part is provided at a position corresponding to the screw hole on the outer housing, and the screw hole is also exposed to the outside of the outer housing.

10. The sensor device according to claim 4, further comprising:
    a fixed member made of metal that defines a screw hole for installing the sensor device by screw fastening, wherein the fixed member is buried in the inner housing so that the screw hole is exposed to the outside of the inner housing, and wherein, a second cut-off part is provided at a position corresponding to the screw hole on the outer housing, and the screw hole is also exposed to the outside of the outer housing.

11. The sensor device according to claim 5, further comprising:

a fixed member made of metal that defines a screw hole for installing the sensor device by screw fastening, wherein the fixed member is buried in the inner housing so that the screw hole is exposed to the outside of the inner housing, and wherein, a second cut-off part is provided at a position corresponding to the screw hole on the outer housing, and the screw hole is also exposed to the outside of the outer housing.

12. The sensor device according to claim 6, further comprising:

a fixed member made of metal that defines a screw hole for installing the sensor device by screw fastening, wherein the fixed member is buried in the inner housing so that the screw hole is exposed to the outside of the inner housing, and wherein, a second cut-off part is provided at a position corresponding to the screw hole on the outer housing, and the screw hole is also exposed to the outside of the outer housing.

13. The sensor device according to claim 1, wherein the externally exposed part is at least one of a detection part, a display part, an operation part, and a cable drawing out part.

14. The sensor device according to claim 2, wherein the externally exposed part is at least one of a detection part, a display part, an operation part, and a cable drawing out part.

15. The sensor device according to claim 3, wherein the externally exposed part is at least one of a detection part, a display part, an operation part, and a cable drawing out part.

16. The sensor device according to claim 4, wherein the externally exposed part is at least one of a detection part, a display part, an operation part, and a cable drawing out part.

17. The sensor device according to claim 5, wherein the externally exposed part is at least one of a detection part, a display part, an operation part, and a cable drawing out part.

18. The sensor device according to claim 6, wherein the externally exposed part is at least one of a detection part, a display part, an operation part, and a cable drawing out part.

* * * * *